UNITED STATES PATENT OFFICE.

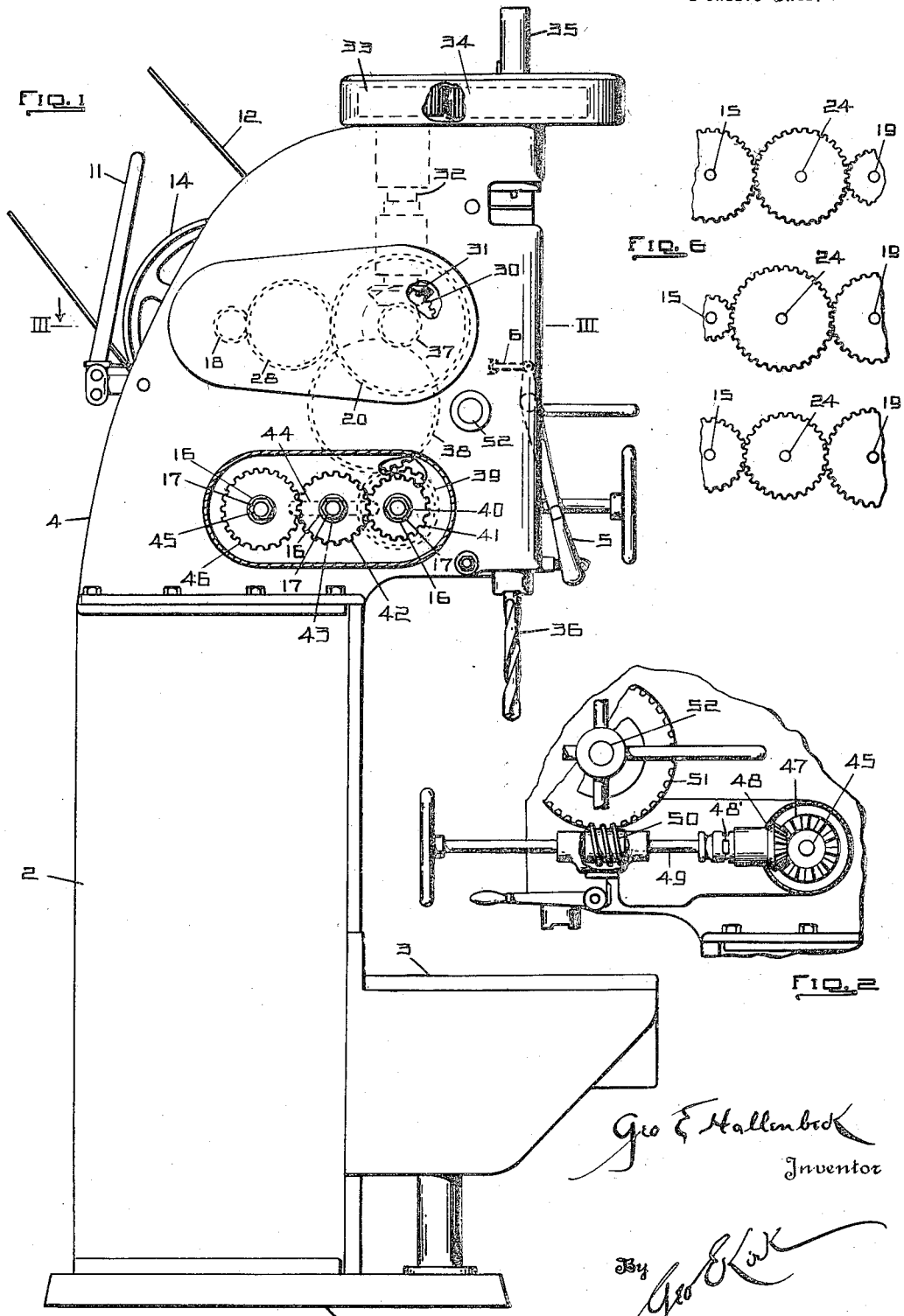

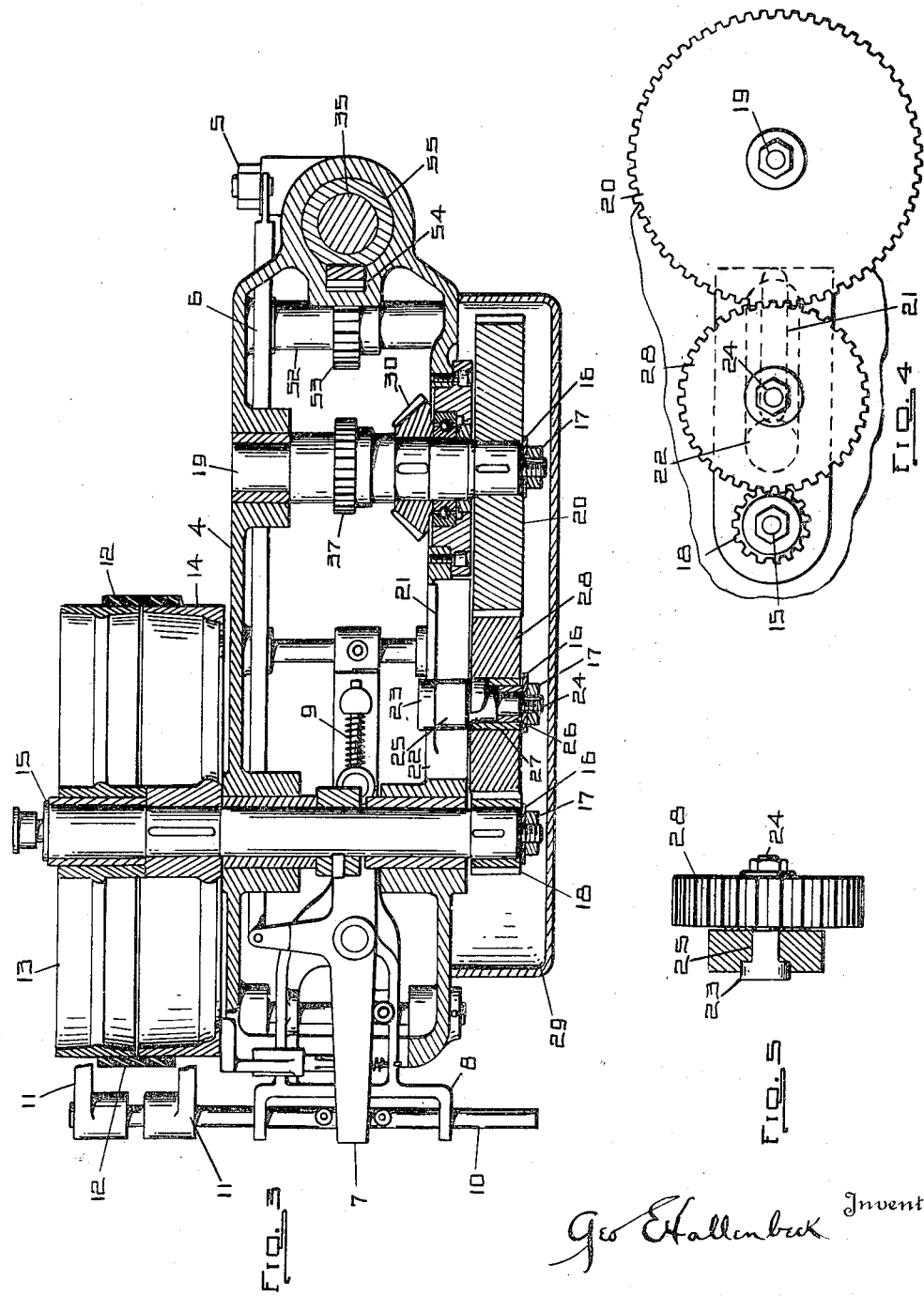

GEORGE E. HALLENBECK, OF TOLEDO, OHIO, ASSIGNOR TO BAKER BROTHERS, OF TOLEDO, OHIO, A FIRM.

VARIABLE-SPEED GEARING.

1,297,462.     Specification of Letters Patent.     Patented Mar. 18, 1919.

Application filed February 18, 1918. Serial No. 217,752.

*To all whom it may concern:*

Be it known that I, GEORGE E. HALLENBECK, a citizen of the United States of America, residing at Toledo, Lucas county, Ohio, have invented new and useful Variable-Speed Gearing, of which the following is a specification.

This invention relates to mechanism for readily providing different determined relative speeds over a wide range between a driver and a driven member.

This invention has utility when incorporated in machine tools, especially for determining speeds to minute fractions in the progress or rotation of the tool or work with a simplified transmission train.

Referring to the drawings:

Figure 1 is a side elevation, with parts broken away, of features of the invention in a power actuated machine tool of the heavy duty drill press type;

Fig. 2 is a fragmentary view from the opposite side of the drill press frame or column, showing a portion of the feed train for the drill spindle;

Fig. 3 is a section on the line III—III, Fig. 1, looking in the direction of the arrow;

Fig. 4 is a front elevation of the speed change effecting gears of the train;

Fig. 5 is a vertical section centrally of Fig. 4; and

Fig. 6 illustrates comparatively how the speed changes may be used.

The drill press is shown as having the base 1 having the upright 2 carrying the work table 3, and the overhang or housing portion of the frame 4. The upright 2 and overhang 4 may comprise the column.

The hand lever 5 may be operated to move the rod 6, levers 7, 8, spring 9, for reciprocating the bar 10 carrying the fork elements 11, 11, coacting with the driving belt 12, for shifting such belt from the idle pulley 13 to the fast pulley 14 on the driving shaft 15 fixed in the frame 4. Removably mounted on the shaft 15 by the washer 16 and nut 17 is the gear 18 keyed to rotate with the shaft 15.

Fixed in the frame 4, parallel to the shaft 15 is the shaft 19, having mounted for ready removal on one end thereof, the gear 20, held in its keyed position to rotate with the shaft 19 by a washer 16 and a nut 17.

Extending from the shaft 15 toward the shaft 19, there is a fixed guide 21 having a terminal enlargement 22 permitting entrance of the head 23 of the pin 24 having the parallel cheeks 25 coacting with the guide 21. A nut 17 thrusts a washer 16 against a sleeve 26 on the pin 24 to draw the head 23 of the pin into binding relation for fixing its position as adjusted in the guide 21. On the sleeve 26 is the loose bearing sleeve 27 of a diameter corresponding to the diameter of shaft 15 at the gear 18, and to the diameter of the shaft 19 at the gear 20, so that these fixed shaft mounting means for the gears 18, 20, render said gears 18, 20 substitutive or interchangeable with each other or either mountable on the sleeve 27, while the intermediate gear 28 loose on the sleeve 27 in mesh with gears 18, 20, simultaneously, may be keyed to rotate with shaft 15 or shaft 19. This three gear train has two meshing pairs falling in a straight line between the axes of the fixed shafts. The axes of the three gears lie in a common plane and the three gears lie in a common plane at right angles to the plane of their axes. With the shafts 15, 19, at a constant distance from each other, and with a pitch of say one half inch for the gears, the total of the teeth active in transmission is constant when this feature is used in a train not extending beyond three gears. Considering Fig. 4 to show gears 18, 28, 20, as having respectively 15, 38 and 60 teeth, or a total of 113 teeth, the speed of shaft 19 may be given a slightly increased speed by having the gears each total 15, 39, 59 teeth, still making the aggregate 113. While a shorter pitch of teeth would make a total of more teeth in this train of three gears, whatever teeth total develops for a particular pitch, in the use of such pitch the number of teeth on the train if limited to three gears should total a constant. But such constant is subject to any integral tooth groupings within the practical range of relative gear sizes for the three gears of this train involving interchangeable gears in the train as well as the substitution of other gears therein. In this connection it is especially to be noted the refinements in speed relation which may be so readily attained by the replacement of gears. Assuming there is a train of gears having 17, 32 and 64 teeth respectively. The speed reduction from the 17 tooth gear to the shaft carrying the 64 tooth gear may have slight speed reduction for the driven shaft by having the gears of the train 17, 31, 65 teeth;
17, 30, 66
17, 29, 67
17, 28, 68
17, 27, 69
16, 32, 65

While for increase in speed the driven shaft the change may be to the train 17, 33, 63, etc. These changes in speed are conveniently and readily effected by removing the detachable gear case 29, loosening the nut 17 on the desired live gear or gears where it is contemplated to make the shift or change. The nut 17 on the pin 24 is also loosened, in order that the intermediate gear may be changed if desired, but also to permit shifting of the pin 24 in the guide 21 in a fixed straight line of the common radius of the fixed shafts 15, 19, to bring about proper meshing relation between the gears of this three gear train. By this holding means for the intermediate gear, its meshing may not be disturbed in operation. Each three gear train assembly with the teeth of the gears totaling the constant for such train, insures meshing for which the gears are designed. The straight guide insures holding of the gears to such meshing. The washers 16 and nuts 17 complete the assembly of the gears on their mounting means.

The shaft 19 carries the bevel gear 30 in mesh with the bevel gear 31 on the upwardly extending shaft 32. This shaft 32 at its upper end carries a gear 33 in mesh with the gear 34. This gear 34 is splined on the drill spindle 35. This train of gearing serves to rotate the member or tool 36.

Also mounted on the shaft 19 is the gear 37 in mesh with the gear 38 which has mesh relation with the gear 39 on the shaft 40. On this shaft 40, readily removably mounted by a washer 16 and nut 17 is a gear 41 in mesh with a gear 42 loosely mounted on a pin 43 similar to the pin 24. This pin 43 is adjustable in the straight line guide 44 radially extending from the shaft 40 toward the fixed axis rotary shaft 45 carrying keyed thereon the gear 46. This gear 46 is readily removable for substitution by loosening a nut 17 and taking off a washer 16, in the same manner as the gears 18, 28, 20, 41, 42. The opposite end of the shaft 45 carries the bevel gear 47 in mesh with a bevel gear 48 having universal joint rotation transmitting connection 48' with the shaft 49 having the worm 50 rockable into and out of mesh relation with the worm wheel 51 on the shaft 52 fixed for rotation in the frame 4. This shaft 52 carries a pinion 53 in mesh with the rack 54 fast with the sleeve 55 about the spindle for determining the feed rate of the spindle, or its rate of reciprocation.

It is to be noted in the transmission train for effecting rotative speed for actuation for the spindle 35, there is an odd number of gears including the gear 28 serving in two rotative pairs and positively held in all ranges of speed adjustment to have its axis intercept the line of the common radius of the two gears with which it meshes. From the driver shaft 15, to feed the spindle 35, there is an odd number of toothed members, including the gears 28, 38, 42, each serving in two rotative pairs and simultaneously during transmission. In the structure of drill herein disclosed, the location of the gear trains is attained with a minimum of gears, for over the gears meshing in but single pairs, the gears 28, 38, 42, each reduces the number of simultaneously operative gears in the train by one gear, or a total of three gears. Further, during operation there are no inactive or idle gears. The three gear substitutive trains have the shafts for the terminal gears a fixed or constant distance apart laterally. These shafts for the terminal gears of the train are also fixed in the frame against lateral movement. The gears on these terminal shafts of the train do not mesh directly, but the transmission is brought about by the intermediate gear. This gear intermediate the terminal gears may rotate on its bearing, such bearing being shiftable laterally to vary its distance from one of the terminal gear shafts.

What is claimed and it is desired to secure by Letters Patent is:

1. A train of toothed gearing comprising a pair of power transmitting gears with fixed axes, an intermediate gear in mesh with said transmitting gears, holding means for maintaining the intermediate gear in a line between the axes of the transmitting gears, and mounting means rendering said gears mutually substitutive.

2. In a drive for a drill press having a member to be actuated, a pair of axially fixed live gears, an intermediate gear in mesh with said live gears, mounting means for the intermediate gear and one of the live gears rendering them mutually substitutive, and a mounting for the other live gear maintaining the axes of the live gears fixed as to each other.

3. In a drive for a drill having a member to be actuated, a pair of axially fixed live gears, an intermediate gear in mesh with said live gears, mounting means for the live gears rendering them mutually substitutive, and holding means for maintaining the intermediate gear in a line between the axes of the live gears.

4. In a drive for a drill having a member to be rotated, a pair of live gears having their axes fixed and lying in a common plane, an intermediate gear in mesh with said live gears, holding means for maintaining the intermediate gear axis in said plane and between the axes of the live gears, and mounting means rendering said gears mutually substitutive.

5. In a drive for a drill having a member to be rotated, a pair of live gears, an intermediate gear in mesh with said live gears, said three gears having their axes lying in a common plane with the outer gears fixed, and mounting means for two of said gears rendering them mutually substitutive.

6. A three gear train of mutually substitutive gears meshing in two pairs, and mounting means maintaining the axes of the three gears in a common plane with the axes of the outer gears fixed.

7. In a drive for a drill, a driving shaft, a drill spindle, and a power transmitting train between the shaft and spindle including two gears each meshing in a common plane with an intermediate gear, a mounting guide for the intermediate gear parallel with the line connecting the two meshings of the intermediate gear, and means for locking the intermediate gear in said guide.

8. A train of gears embodying at least two rotative pairs successively transmissive in a first plane, the axes of said gears lying in a second plane, there being mounting means rendering a plurality of said gears readily substitutive for speed change, and a holding frame positively fixing the axes of the outer of said gears and providing intermediate gear mounting adjustment.

9. In a drive for a drill spindle, first and second axially fixed rotative shafts, a first gear on the first shaft, a second gear on the second shaft, a third gear meshing with the first and second gears, a guide extending radially of the first gear toward the second gear precluding movement of the third gear axis out of the plane of the first and second shaft axes, and means for positioning the third gear in said guide.

10. In a drill press, a vertical drill spindle, a vertical shaft connected to actuate the spindle, and a gear train for actuating the vertical shaft comprising a pair of horizontal shafts, gears on said horizontal shafts, an intermediate gear, and fixed guide means extending radially of one horizontal shaft toward the other horizontal shaft and confining intermediate gear adjustment to the direction of the common radius line of the two horizontal shafts.

In witness whereof I affix my signature.

GEO. E. HALLENBECK.